UNITED STATES PATENT OFFICE.

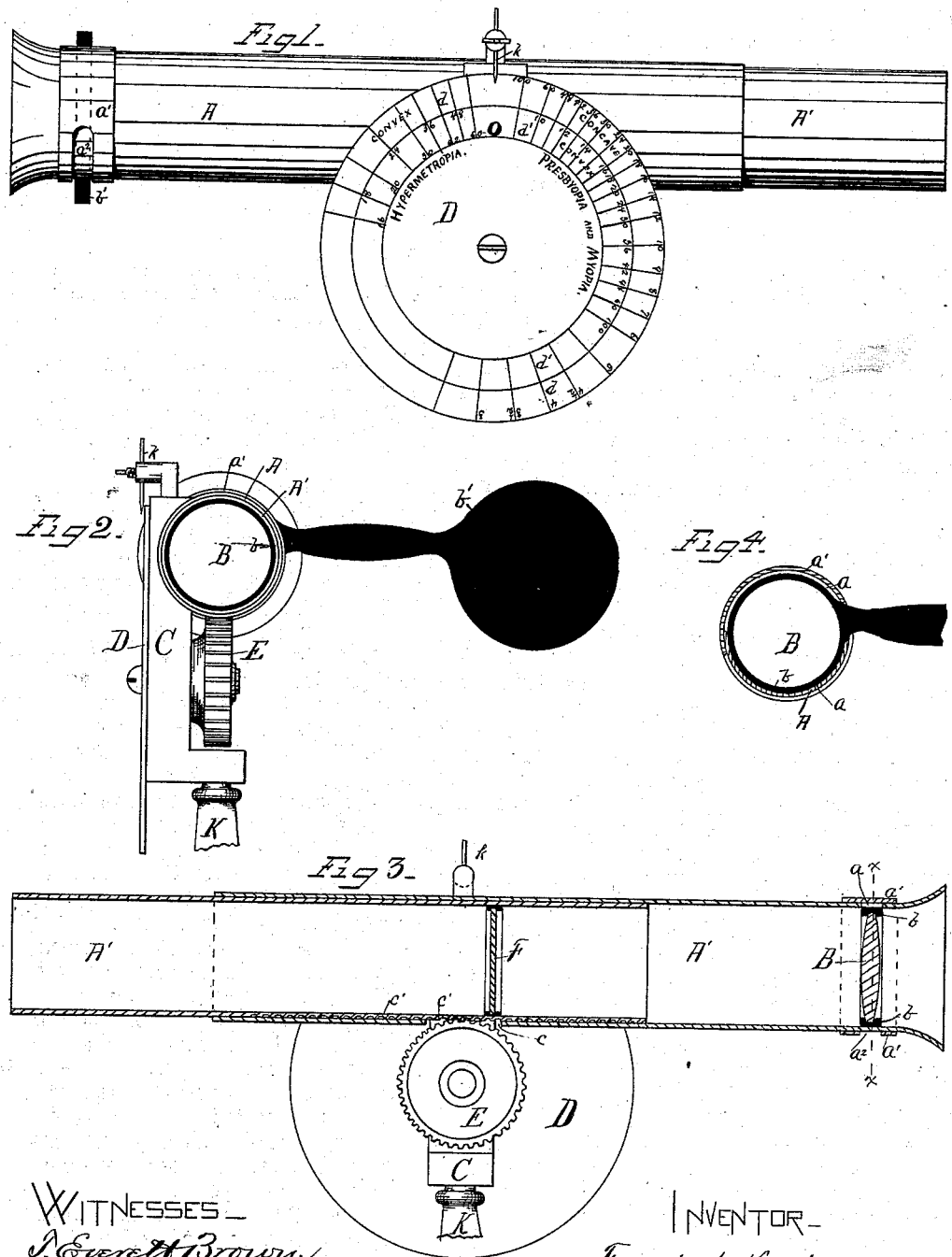

FRANCIS A. HARDY, OF CHICAGO, ILLINOIS.

OPTOMETER.

SPECIFICATION forming part of Letters Patent No. 268,016, dated November 28, 1882.

Application filed May 22, 1882. (No model.)

*To all whom it may concern:*

Be it known that I, FRANCIS A. HARDY, of Chicago, in the county of Cook and State of Illinois, have invented certain new and useful Improvements in Optometers, of which the following is a specification.

My invention relates to improvements in devices for measuring optical defects or irregularities for the purpose of readily selecting proper glasses or lenses to suit different individuals.

Heretofore optometers have been constructed for measuring the degree of myopia or hypermetropia—short or long sightedness—with which any particular individual may be affected, and provided with a scale indicating the number of the convex or concave lens which will compensate for the optical irregularity. These irregularities—long and short sightedness—are due to the abnormal or unnatural configuration of the eye, in the former the retina being too near and in the latter too far back from the lens of the eye; and the instruments commonly in use for selecting glasses or lenses have heretofore been constructed on the principle or theory that suitable glasses for all persons, young or all, may be indicated by an instrument designed to measure the degree of the supposed improper position of the retina in relation to the lens of the eye—whether it is too close or too far back. It has been found, however, that optical defects commonly due to old age, technically called "presbyopia," are occasioned not by any change in the relative position of the retina and lens of the eye or any supposed flattening of the eye-ball, but to the fact that the lens of the eye, while it remains the same as to its normal shape and distance from the retina in old age, loses in part its power of contractility, or power to accommodate its focus to objects at different distances; and the object of the present invention is to provide an instrument for measuring the degree of this defect, or loss of power of contractility of the optic lens, in connection also with a device for indicating the degree of long or short sightedness.

In the accompanying drawings, which form a part of this specification, and in which similar letters of reference indicate like parts, Figure 1 is a side elevation of a device embodying my invention. Fig. 2 is an end view of the same. Fig. 3 is a central vertical longitudinal section, and Fig. 4 is a cross-section on line $x\ x$ of Fig. 3.

In the drawings, A and A' represent a pair of telescoping tubes. The outer tube, A, is provided with a transverse slot, $a$, cut about half-way through the tube, so that the lens B, mounted in the frame $b$, may be inserted in place in the tube through the slot. $a'$ is a ring or band, provided with a similar slot, $a^2$, for securing the lens in the tube. To insert the lens in the tube, the ring is to be turned until its slot and that of the tube are coincident, when the lens may be inserted, and then secured by turning the ring half around, which also serves to exclude from the lens external light through the slot.

C is a brace or arm secured to the tube A, upon which is mounted the graduated disk D and the pinion E. This pinion projects through a longitudinal slot, $c$, in the tube A, so that its teeth engage with the rack $c'$ on the inner tube, A', whereby the inner tube is moved in or out.

F is an object-disk fixed in the inner tube, consisting preferably of rows of different-sized light letters on a black background or surface as to one half and of light radial lines on the other half, for detecting the existence of astigmatism. The frame $b$ of the lens is made preferably of hard rubber, and is provided with a black disk shade or object, $b'$, at its end for the other eye, so that the instrument may be used without closing either eye, which would tend in some degree to impair or affect the power of the eye being tested, and thereby occasion errors. By simply turning the lens around it will be observed the instrument may be used for testing either eye.

The disk D is provided with an outer graduated scale, $d$, for indicating the number of the convex or concave lens needed to supplement the particular degree of hypermetropia or myopia that may be indicated by the pointer, and an inner graduated scale, $d'$, for indicating the number of the convex lens that will be proper for the particular degree of presbyopia that may be indicated by the pointer.

The manner of using the instrument in cases of presbyopia is to first move the object in close to the lens, and then slowly move it out by turning the disk D until the person can see the object distinctly, when the pointer will indicate on the inner scale the number of the convex lens suitable for the person to use. In cases of myopia and hypermetropia the instrument is used in the ordinary manner—viz., by first moving the object out, and then slowly drawing it in nearer to the lens by turning the disk D until the person can see distinctly, when the pointer will indicate on the outer scale the number of the concave or convex lens, as the case may be, suitable to be used.

By reason of the graduated disk D, I am enabled to use a much more powerful lens without crowding or too much condensing the graduations and figures of the scale, which I find of great advantage, as the lens thereby magnifies and renders more distinct optical peculiarities of the eye.

The pointer is indicated by the letter $k$ in the drawings; and K represents the handle or pedestal upon which the instrument may be mounted. The point marked O on the scale represents the principal focus of the lens.

What I claim is—

1. In an optometer, the combination of the tube A, provided with transverse slot $a$, ring $a'$, provided with corresponding slot, $a^2$, lens B, secured in said tube by said slotted ring and provided with shade $b'$, telescoping tube A', provided with the object-disk F, and rack $c$, and graduated disk D, and pinion E, mounted on stud C, all arranged and operating substantially as specified.

2. The combination of the lens, the movable object, and a graduated disk for indicating the amount of said movement, substantially as specified.

FRANCIS A. HARDY.

Witnesses:
T. EVERETT BROWN,
EDMUND ADCOCK.